Oct. 21, 1952     R. S. MILLER     2,614,685
CONVEYER FLIGHT AND CHAIN LINK

Filed Nov. 17, 1947     2 SHEETS—SHEET 1

INVENTOR
ROBERT S. MILLER
BY Cook and Schermerhorn
ATTORNEYS

Oct. 21, 1952  R. S. MILLER  2,614,685
CONVEYER FLIGHT AND CHAIN LINK
Filed Nov. 17, 1947  2 SHEETS—SHEET 2

INVENTOR
ROBERT S. MILLER
BY Cook and Schermerhorn
ATTORNEYS

Patented Oct. 21, 1952

2,614,685

UNITED STATES PATENT OFFICE 2,614,685

CONVEYER FLIGHT AND CHAIN LINK

Robert S. Miller, Portland, Oreg.

Application November 17, 1947, Serial No. 786,463

9 Claims. (Cl. 198—176)

This invention relates to improvements in conveyors and has particular reference to insertable flights for chain conveyors.

Various types of insertable flights have heretofore been used in chain conveyors, and the objects of the present invention are, in general, to provide an insertable flight of greater ruggedness and durability, a flight which can easily be inserted and removed from the conveyor without the use of tools, a flight which is simple and inexpensive to manufacture, a flight which is free of small parts, improvements in the form of connection with the conveyor chain to avoid high stresses in the flight where it is connected with the chain, and to provide a form of construction which will maintain a strength in the connecting parts substantially equal to the strength of the chain links between the flights.

The present construction comprises a pair of U-shaped links having lugs on their shanks to engage and be secured in the opposite sides of a connecting block which is designed to easily sustain the chain tension of the conveyor. Each of the links is insertable in the block through a keyhole opening and secured therein by rotating the links through a quarter turn to engage the lugs on the link within the block. In this manner, each of the links is securely anchored in the block to sustain the chain tension, while at the same time being readily removable without requiring the use of bolts, keeper pins, or other customary securing devices.

In one embodiment of the invention, the block in which the links are thus anchored is made as a separate element and the flight is provided with a chamber to receive the block in order to mount the flight on the conveyor chain to be moved thereby. In another embodiment of the invention, the connecting block is made an integral part of the conveyor flight.

Still other objects and advantages will be apparent from the following description with reference to the accompanying drawings illustrating the preferred embodiments of the invention. It is to be understood, however, that various changes may be made in the construction and arrangement of parts, and that all such modifications within the scope of the appended claims are included in the invention.

In the application of the present invention a number of flights of the type herein illustrated are inserted at intervals in an endless conveyor chain which is trained around sprocket wheels and the like and driven by a prime mover for the purpose of transporting material. In both embodiments of the invention, the flight itself comprises an angle iron bar having a horizontal flange adapted to slide on a surface upon which the material is deposited, and a vertical flange to push a quantity of the material ahead of the flight as the chain moves. The vertical flange is braced by a plurality of webs and provision is made utilizing the principles of the invention for detachably connecting the conveyor chain with the central part of the flight to provide draft for the flight.

Figure 1:
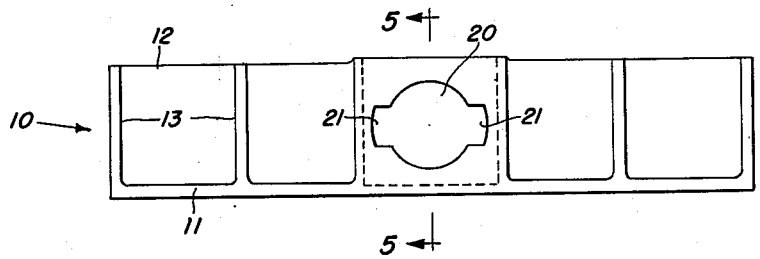
Figure 1 is a rear elevation view of one form of conveyor flight embodying the principles of the present invention.
Figure 2:
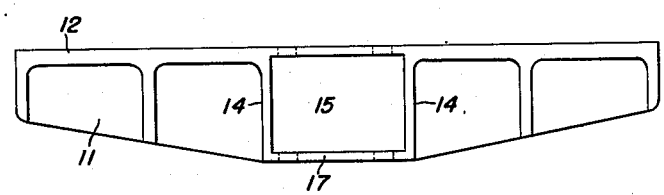
Figure 2 is a top plan view of the flight shown in Figure 1.

In the first embodiment of the invention illustrated in Figures 1 to 5, the flight is designated generally by the numeral 10 and comprises a bottom flange 11, a vertical front flange 12, and a plurality of triangular bracing webs 13. In the center portion of the flight, a pair of spaced vertical walls 14 provide a rectangular box or chamber 15 to receive the connector blocks 16 shown in Figure 3. The chamber 15 is open on top but is closed on the bottom by the bottom flange 11. The front side of the chamber 15 comprises the front vertical flange 12, and the rear side of this chamber comprises a vertical wall 17 extending between the walls 14 and being integrally united therewith and also with the bottom flange 11. Openings 20 taking the form of keyhole openings having lateral extensions 21 are provided in the front and rear walls of the chamber 15 as shown in Figure 1.

Figure 3:
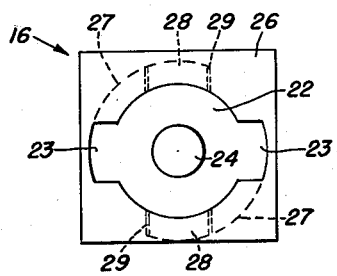
Figure 3 is a rear elevation view of the connector block to be used in the flight shown in Figures 1 and 2.

The block 16 is designed to fit loosely in the chamber 15 and has keyhole openings 22 with lateral extensions 23 on its front and rear sides to register with the keyhole openings 20 in the front and rear walls of the chamber 15. In the center of each opening 22 is a cylindrical stud 24 extending from a central wall 25 in the block. The block 16 has front and rear walls 26 behind which are arcuate passages 27 extending through a quarter turn from each of the lateral extensions 23, as shown in Figure 3. Each of these arcuate passages terminates in a recessed seat 28 having bevelled edges 29 to position and retain lugs inserted through the lateral extensions 23 and rotated to the end of the arcuate passages.

Figure 4:
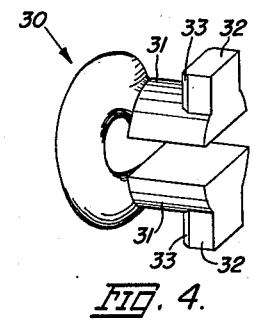
Figure 4 is a perspective view of a connector link to be used with the above flight and connector block.
Figure 5:
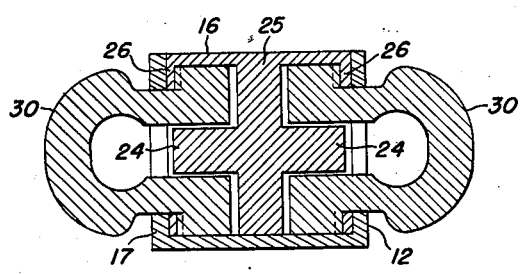
Figure 5 is a sectional view taken on the line 5—5 of Figure 1, with the parts assembled.
Figure 6:
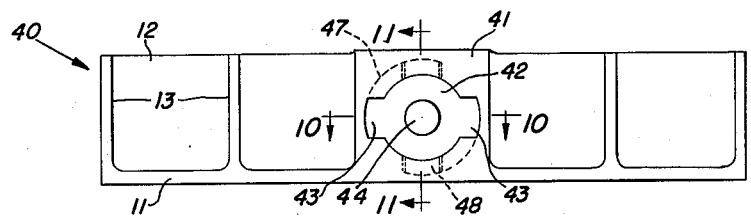
Figure 6 is a rear elevation view of a second embodiment of conveyor flight in which the connector block is integral with the flight.
Figure 7:
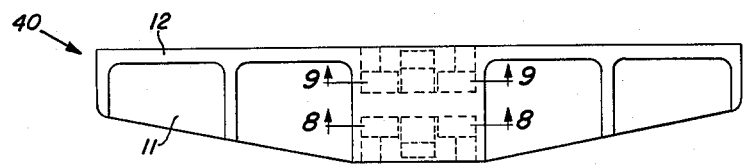
Figure 7 is a top plan view of the flight shown in Figure 6.
Figures 8, 9, 10:
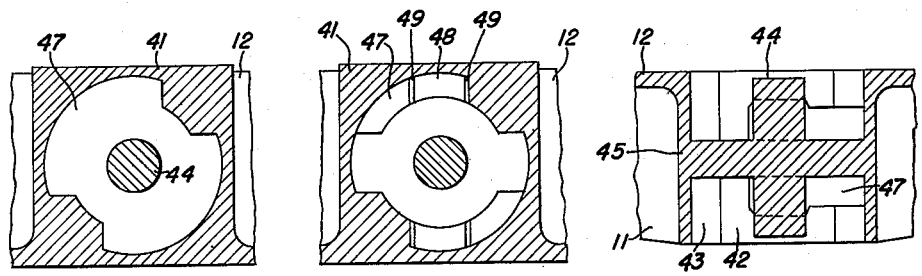
Figure 8 is a sectional view taken on the line 8—8 of Figure 7.
Figure 9 is a sectional view taken on the line 9—9 of Figure 7.
Figure 10 is a sectional view taken on the line 10—10 of Figure 6.
Figure 11:
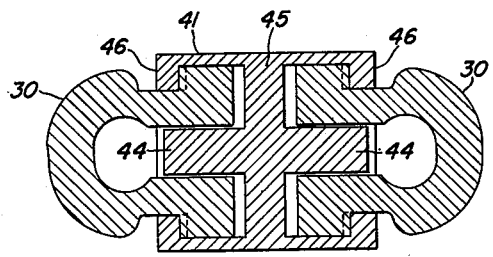
Figure 11 is a sectional view taken on the line 11—11 of Figure 6.

By reason of the construction just described, the block 16 is adapted to receive a pair of links 30 extending on opposite sides thereof as shown in Figure 5 to connect the flight in a conveyor chain. The two links are identical and their shape is best shown in Figure 4. The links 30 are of U-shape having shanks 31 which form segments of a common cylinder having a diameter slightly less than the circular portion of the openings 20 and 22. The space between the shanks is slightly greater than the diameter of the central stud 24. The outer side of the end of each shank is provided with a laterally extending lug 32 of a size to be insertable in the lateral extensions 21 and 23 and to rotate within the arcuate passages 27. The corners of the lugs 32 are bevelled at 33 to fit the bevelled sides 29 in the recesses 28.

Thus, when a link 30 is inserted in a keyhole opening 22 and rotated through a quarter turn, the lugs 32 seat themselves in the seats 28 to prevent rotation of the link and accidental disengagement from the block 16 as long as tension is applied to the chain. Obviously, a strong chain tension is not necessary to hold the links in place inasmuch as the slight tension produced by a sag in the chain or the mere dragging of the chain will serve to hold the lugs 32 in their recessed seats. Furthermore, it is appreciated that a chain has a tendency to resist twisting about its own axis, so that if the chain is not twisted improperly when the link is inserted the chain itself will tend to hold the lugs 32 in vertical position and will tend to resist rotation of the link to the extent necessary to withdraw it through the opening 22.

It is apparent in the embodiment just described that the block 16 sustains the chain tension in the conveyor independently of the flight 10. The flight 10 is in reality floatingly mounted on the block 16 to be carried along by the block as the chain moves, but without having any other positive connection with the links 30. The flight is retained on the block 16 merely by the presence of the shanks 31 extending through the openings 20 in the front and back sides of the flight, and when a flight is to be removed from the conveyor it is only necessary to rotate each of the links 30 through a quarter turn to release both the links 30 and the flight from the block 16. This is very quickly and easily accomplished and requires no tools whatever.

In the modification shown in Figures 6 to 11, the same links 30 are used and the locking arrangement of these links in a connector block is the same but the connector block is made integral with the flight. Thus, the flight 40 shown in Figures 6 and 7 has the same bottom flange 11, front flange 12, and vertical webs 13. However, the center portion of the flight designated by the numeral 41 constitutes an integral connector block having the same features as the block 16 shown in Figures 3 and 5. Corresponding to the block 16, the block 41 has keyhole openings 42 on opposite sides thereof with oppositely directed lateral extensions 43. In the center of each opening 42 is a stud 44 extending outwardly from a central vertical wall 45. End walls 46 enclose arcuate passages 47 leading to recessed seats 48 to receive the lugs 32 on the links. The sides of the seats are bevelled at 49 to fit the bevelled edges 33 on the lugs.

In this embodiment the flight 40, by reason of its being integral with the block 41, itself constitutes a link in the conveyor chain. Other things being equal, the strength is the same as the first embodiment with the advantage of having one less part. The keyhole openings 20 and 42 constitute apertures in exterior wall surfaces on opposite sides of the flight which cooperate with the recessed interior wall surfaces forming the seats 28 and 48 to comprise rotative engagement type quick detachable chain end link connector means for connecting the flights in the conveyor chain. When the links 30 are detached from the flight 40, there are no other parts to be concerned with. In most conventional chain conveyors the connecting means for the flights requires small parts such as bolts, nuts, keys, and the like. It is desirable to avoid the use of such parts if possible because they may be accidentally dropped or may work loose from the conveyor in operation and fall into the material being handled where they may cause serious damage to other equipment working with the material. Also the likelihood of a flight being improperly or insecurely attached to the conveyor chain, and the likelihood of trouble, increases with the number of parts required for making such attachment and with the complexity of the operation involved. In the present construction, the number of parts has been reduced substantially to the number of functional elements required in the conveyor, thereby eliminating the possibility of losing parts in the machinery or in the material being handled, and insuring that a proper connection will be made each time a new flight is inserted.

Having now described my invention and in what manner the same may be used, what I claim as new and desire to protect by Letters Patent is:

1. In a conveyor chain, a U-shaped link having a pair of shanks, each of said shanks constituting a segment of a common cylinder, and a laterally directed lug on each of said shanks, said lugs extending in opposite directions in the general plane of said shanks.

2. In a conveyor flight, a chamber for a connector block, said chamber having walls on the front and back sides of the flight, connector openings in said walls, a connector block in said chamber confined between said walls, and detachable chain connector links extending through said openings and engaged solely with said block.

3. In a conveyor flight, a chamber for a connector block, said chamber being open at its top for insertion of said block and having walls on the front and back sides of the flight, connector openings in said walls, a connector block in said chamber having connector openings in its opposite sides in register with the connector openings in said walls, and detachable chain connector links extending through said wall openings and having rotative engagement in said connector block openings, said connector block being retained in said chamber by said links.

4. In a conveyor, a rotatable, quick detachable chain end connector comprising a U-shaped link having a pair of parallel shanks, and a single perpendicular lug on each of said shanks, said two lugs being oppositely directed away from each other in common alignment in the general plane of said shanks.

5. In a conveyor having a plurality of flights connected in a chain, quick detachable rotative engagement connector means in each flight having apertured and recessed wall portions defining a keyhole opening for a chain end link, and a U-shaped chain end link having shank lugs engaged with said connector means by rotation in said keyhole opening on the axis of the chain.

6. In a conveyor flight for a conveyor having a plurality of flights connected in a chain, apertured exterior wall surfaces on opposite sides of the flight, a removable connector block disposed between said exterior wall surfaces, and recessed interior wall surfaces in said connector block behind said exterior wall surfaces, said apertures and interior wall surfaces defining rotative engagement type quick detachable chain end link connector means for connecting the flight in the chain.

7. In a conveyor, a connector block having apertured and recessed walls comprising chain end link connectors in two opposite sides thereof, a chain end link secured in each of said connectors, and a conveyor flight having spaced openings on said opposite sides of said connector block receiving said end links to secure said flight to said connector block.

8. In a conveyor flight for a conveyor having a plurality of flights connected between end links in a chain, rotative engagement type connector means for connecting the flight to a pair of said end links in the chain comprising apertured exterior wall portions on opposite sides of the flight and interior wall portions behind said exterior wall portions, said interior wall portions comprising quarter turn arcuate passageways terminating in recessed seats for the end links.

9. In a conveyor flight for a conveyor having a plurality of flights connected between end links in a chain, exterior wall portions on opposite sides of the flight having keyhole openings, and interior wall portions behind said exterior wall portions, said keyhole openings and interior wall portions comprising rotative engagement type connector means for connecting the flight to a pair of said end links in the chain, said interior wall portions comprising a pair of quarter turn arcuate passageways behind each said keyhole opening terminating in recessed seats for an end link.

ROBERT S. MILLER.

REFERENCES CITED

The following references are of record in the file of this patent:

UNITED STATES PATENTS

| Number | Name | Date |
| --- | --- | --- |
| 345,497 | Garland | July 13, 1886 |
| 499,526 | Dodge | June 13, 1893 |
| 972,698 | Jones | Oct. 11, 1910 |
| 1,453,088 | Bachman et al. | Apr. 24, 1923 |
| 1,850,686 | Pangborn | Mar. 22, 1932 |
| 2,138,576 | Gebert | Nov. 29, 1938 |
| 2,278,853 | Hudson | Apr. 7, 1942 |

FOREIGN PATENTS

| Number | Country | Date |
| --- | --- | --- |
| 103,556 | Sweden | Jan. 20, 1942 |